US012310409B2

(12) United States Patent
Buehler

(10) Patent No.: US 12,310,409 B2
(45) Date of Patent: May 27, 2025

(54) SUSCEPTOR HEATING ELEMENT FORMED FROM SHAPE MEMORY MATERIAL FOR AEROSOL GENERATING DEVICE

(71) Applicant: Philip Morris Products S.A., Neuchatel (CH)

(72) Inventor: Frederic Ulysse Buehler, Neuchatel (CH)

(73) Assignee: Philip Morris Products S.A., Neuchatel (CH)

( * ) Notice: Subject to any disclaimer, the term of this patent is extended or adjusted under 35 U.S.C. 154(b) by 456 days.

(21) Appl. No.: 17/765,990

(22) PCT Filed: Oct. 1, 2020

(86) PCT No.: PCT/EP2020/077566
§ 371 (c)(1),
(2) Date: Apr. 1, 2022

(87) PCT Pub. No.: WO2021/064124
PCT Pub. Date: Apr. 8, 2021

(65) Prior Publication Data

US 2022/0369716 A1 Nov. 24, 2022

(30) Foreign Application Priority Data

Oct. 2, 2019 (EP) .................................... 19201073

(51) Int. Cl.
*A24F 40/465* (2020.01)
*A24D 1/20* (2020.01)
(Continued)

(52) U.S. Cl.
CPC .............. *A24F 40/465* (2020.01); *A24D 1/20* (2020.01); *A24F 40/20* (2020.01); *H05B 6/105* (2013.01); *C22F 1/006* (2013.01)

(58) Field of Classification Search
None
See application file for complete search history.

(56) References Cited

U.S. PATENT DOCUMENTS

2015/0096293 A1* 4/2015 Shome .................... F03G 7/065 60/528
2018/0206552 A1 7/2018 Sebastian et al.
(Continued)

FOREIGN PATENT DOCUMENTS

CN 1202082 A 12/1998
CN 204072365 U 1/2015
(Continued)

OTHER PUBLICATIONS

Combined Russia Office Action and Search Report issued Oct. 13, 2022 in Russian Patent Application No. 2022109659 (with unedited computer generated English Translation), 17 pages.
(Continued)

*Primary Examiner* — Ross N Gushi
(74) *Attorney, Agent, or Firm* — Oblon, McClelland, Maier & Neustadt, L.L.P.

(57) ABSTRACT

A susceptor heating element is provided for an aerosol-generating device, the susceptor heating element being configured to heat an aerosol-forming substrate when received in the aerosol-generating device, and the aerosol-forming device including an induction coil configured to generate an alternating magnetic field when an alternating current is provided to the induction coil, the susceptor heating element being formed from a shape-memory material. An aerosol-generating article is also provided.

18 Claims, 4 Drawing Sheets

(51) Int. Cl.
*A24F 40/20* (2020.01)
*H05B 6/10* (2006.01)
*C22F 1/00* (2006.01)

(56) References Cited

U.S. PATENT DOCUMENTS

| | | | | |
|---|---|---|---|---|
| 2020/0329774 | A1 | 10/2020 | Campitelli | |
| 2021/0289841 | A1* | 9/2021 | Batista | A24F 40/42 |

FOREIGN PATENT DOCUMENTS

| | | | |
|---|---|---|---|
| CN | 208510081 | U | 2/2019 |
| EP | 0 884 928 | A1 | 12/1998 |
| EP | 2 836 710 | A2 | 2/2015 |
| EP | 3 052 803 | A1 | 8/2016 |
| JP | 2000-116371 | A | 4/2000 |
| JP | 2011-256408 | A | 12/2011 |
| JP | 2014-529475 | A | 11/2014 |
| JP | 2015-535320 | A | 12/2015 |
| JP | 2018-504922 | A | 2/2018 |
| JP | 2018-530311 | A | 10/2018 |
| JP | 2019-515659 | A | 6/2019 |
| JP | 2019-134701 | A | 8/2019 |
| RU | 2 685 335 | C1 | 4/2019 |
| WO | WO 2013/079794 | A2 | 6/2013 |
| WO | WO 2015/050599 | A1 | 4/2015 |
| WO | WO 2015/177257 | A1 | 11/2015 |
| WO | WO 2017/068099 | A1 | 4/2017 |
| WO | WO 2019/030353 | A1 | 2/2019 |
| WO | WO 2019/130128 | A1 | 7/2019 |

OTHER PUBLICATIONS

Japanese Office Action issued Mar. 20, 2023 in Japanese Patent Application No. 2022-520073 (with English Translation), 11 pages.
Japanese Office Action issued Oct. 26, 2023 in Japanese Patent Application No. 2022-520073 (with English Translation), 13 pages.
International Search Report and Written Opinion issued Mar. 17, 2021 in PCT/EP2020/077566 filed Oct. 1, 2020, 18 pages.
Extended European Search Report issued Mar. 25, 2020 in European Patent Application No. 19201073, filed Oct. 2, 2019, 8 pages.
International Preliminary Report on Patentability issued Jul. 23, 2021 in PCT/EP2020/077566 filed Oct. 1, 2020, 8 pages.
Chinese Office action daled May 18, 2024 in corresponding Chinese Patent Application No. 202060062974.6 (with English translation), 15 pages.
Zhang Dongxing et al. "Polymer Matrix Composites Science and Engineering." Harbin Institute of Technology Press, 1st Edition, Jul. 2018, p. 376.

* cited by examiner

Fig. 1
Fig. 1A
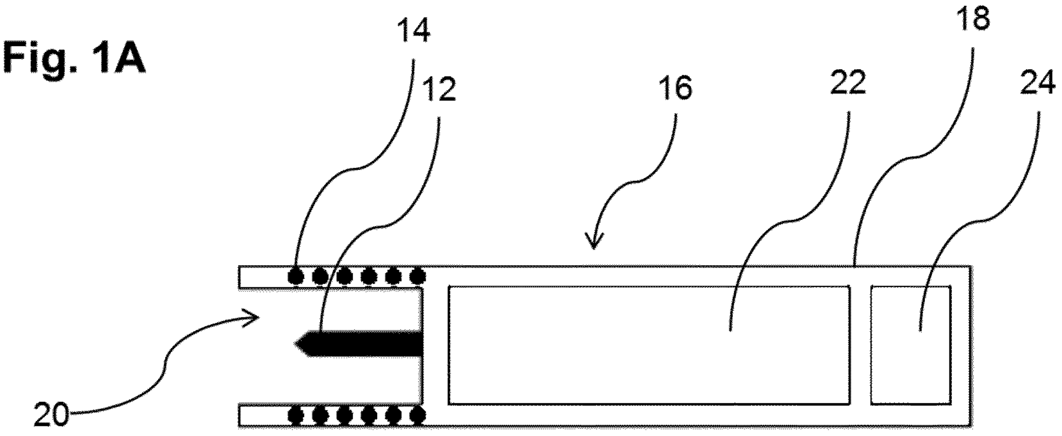
Fig. 1B
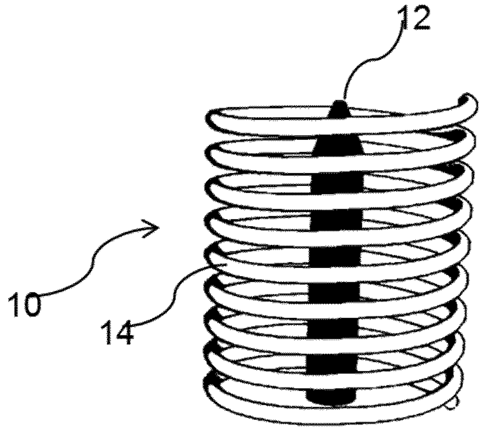

SUSCEPTOR HEATING ELEMENT FORMED FROM SHAPE MEMORY MATERIAL FOR AEROSOL GENERATING DEVICE

The present invention relates to a susceptor heating element formed from a shape-memory material for use with an aerosol-generating device. The present invention further relates to an aerosol-generating system, an aerosol-generating device and article comprising the susceptor heating element and to a method for manufacturing the susceptor heating element.

Aerosol-generating systems are known which heat but which do not burn aerosol-forming substrates such as tobacco. Such systems heat aerosol-forming substrates to a sufficiently high temperature for generating an inhalable aerosol.

Such systems are known to consist of an aerosol generating device for generating an inhalable aerosol from a consumable article. The aerosol-generating article may have a rod shape for insertion of the aerosol-generating article into a heating chamber of the aerosol-generating device. A heating element is arranged in or around the heating chamber for heating the aerosol-forming substrate once the aerosol-generating article is inserted into the heating chamber of the aerosol-generating device.

In inductively heated aerosol-generating systems, the heating element consists of an induction coil and a susceptor heating element. The susceptor heating element is made from magnetically permeable and electrically conductive material. When such susceptor heating element is exposed to an alternating magnetic field, heat is generated in the susceptor heating element. The heating mechanism is mainly based on the generation of eddy currents and hysteresis effects in the susceptor heating element. At least some of this heat generated in the susceptor is transferred from the susceptor to the aerosol-forming substrate arranged in thermal proximity to the susceptor to produce the aerosol and evolve the desired flavor.

The susceptor may be located in or around the aerosol generating substrate. The material of the susceptor heating element largely influences the heat generation. In inductively heated aerosol-generating systems also the shape of the susceptor heating element may affect the heat generation. In order to allow for a consistent user experience it may therefore be desirable to ensure integrity of the shape of the susceptor heating element throughout the life span of the heating element.

It is an object of the present invention to provide a susceptor heating element for use with an aerosol-generating device. It is a further object of the present invention to provide such susceptor heating element which retains its shape even upon repeated use.

At least one of these objects is achieved by the present invention by a susceptor heating element for use with an aerosol-generating device for heating an aerosol-forming substrate when received in the device. The aerosol generating device comprises an induction coil configured to generate an alternating magnetic field when an alternating current is provided to the coil. The susceptor heating element is formed from a shape-memory material.

A shape-memory material is a material that can be deformed at lower temperatures, but which returns to its original shape when heated to elevated temperatures. The shape-memory materials used in the present invention may be a material that can be deformed at room temperature, but which returns to its original shape when heated to the normal operating temperature of the aerosol-generating device.

The “operating temperature” of an aerosol-generating device lies between 180 and 400 degrees Celsius. This temperature depends on the type of aerosol-generating device and on the aerosol-forming substrate that is used.

The operating temperature of the aerosol-generating system may range between 100 and 450 degrees Celsius. The operating temperature of the aerosol-generating system may range between 150 and 300 degrees Celsius. The operating temperature of the aerosol-generating system may range between 180 and 250 degrees Celsius. The operating temperature of the aerosol-generating system may range between 200 and 230 degrees Celsius. The operating temperature of the aerosol-generating system may range between 200 and 400 degrees Celsius. The operating temperature of the aerosol-generating system may range between 250 and 360 degrees Celsius. The operating temperature of the aerosol-generating system may range between 280 and 330 degrees Celsius.

The shape-memory material of the susceptor heating element may be configured such that the susceptor heating element recovers a corrugated shape when heated to a temperature range around the operating temperature of the aerosol-generating device.

A shape-memory material suitable for the susceptor heating element may have a transformation temperature of between 100 and 600 degrees Celsius.

A shape-memory material that is suitable for the susceptor heating element of the present invention may be a shape-memory alloy. Suitable shape-memory alloys include alloy materials such as Titanium-Nickel-Paladium (Ti—Ni—Pd), Nickel-Titanium-Hafnium (Ni—Ti—Hf), Nickel-Titanium-Zirconium (Ni—Ti—Zr), and Copper-Aluminium-Nickel (Cu—Al—Ni). These metal alloys all have a transformation temperature that ranges between 100 and 530 degrees Celsius and have a sufficiently good shape-memory effect.

In addition these metal alloys have relatively low material cost. Accordingly, such materials are suitable to be produced in sufficient large quantities and at reasonable cost.

The susceptor heating element of the present invention may have any desired original shape. The susceptor heating element may have a straight needle shaped design. The susceptor heating element may be shaped in the form of a pin. The susceptor heating element may be shaped in the form of a rod.

The susceptor heating element may have a flat foil-shaped design. The susceptor heating element may comprise two opposing major surfaces joined by two minor surfaces.

The susceptor heating element may have a length and a cross-section perpendicular to the length, wherein the cross-section has a width and a depth, and wherein the length of the susceptor heating element is greater than the width of the cross-section, and the width of the cross-section is greater than the depth of the cross-section.

The susceptor heating element may have a bent or multiply bent shape. The susceptor heating element may have a corrugated shape. The susceptor heating element may have a wavy shape. The susceptor heating element may have a wavy shape, with a regular sinusoidal shape. The susceptor heating element may have a wavy shape with a constant pitch. The pitch of the sinusoidal shape may range up to 20 millimeters. The pitch of the sinusoidal shape may range between 1 and 15 millimeters. The pitch of the sinusoidal shape may range between 1 and 10 millimeters. The pitch of the sinusoidal shape may range between 1 and 5 millimeters.

The aerosol-generating device may comprise one or more induction coils. The induction coil may be used to generate an alternating magnetic field. The induction coil may surround the susceptor heating element in use. Preferably, two induction coils are provided.

If two induction coils are used, the first and second induction coil may have different diameters. The first and second induction coil may be helical and concentric and may have different diameters. In such embodiments, the smaller of the two coils may be positioned at least partially within the larger of the first and second induction coil.

The windings of the first induction coil may be electrically insulated from the windings of the second induction coil.

The first and second induction coil may be formed from the same type of wire. The first induction coil may be formed from a first type of wire and the second induction coil may be formed from a second type of wire which is different to the first type of wire. For example, the wire compositions or cross-sections may differ. In this manner, the inductance of the first and second induction coil may be different even if the overall coil geometries are the same. This may allow the same or similar coil geometries to be used for the first and second induction coil. This may facilitate a more compact arrangement of the aerosol-generating device.

Suitable materials for the induction coil include copper, aluminium, silver and steel. The induction coil may be formed from a wire of such materials. The induction coil may be formed from a wire of copper or aluminium.

If two induction coils are used, the first coil may comprise a first wire material and the second coil may comprise a second wire material which is different from the first wire material. The electrical properties of the first and second wire material may differ. For example, first type of wire may have a first resistivity and the second type of wire may have a second resistivity which is different to the first resistivity.

The aerosol-generating device may comprise a flux concentrator. The flux concentrator may be made from a material having a high magnetic permeability. The flux concentrator may be arranged surrounding the induction heating arrangement. The flux concentrator may concentrate the magnetic field lines to the interior of the flux concentrator thereby increasing the heating effect of the susceptor heating element by means of the induction coil.

As used herein, the term 'aerosol-forming substrate' relates to a substrate capable of releasing volatile compounds that can form an aerosol. Such volatile compounds may be released by heating the aerosol-forming substrate. An aerosol-forming substrate may conveniently be part of an aerosol-generating article.

The present invention also relates to an aerosol-generating device comprising an susceptor heating element as described above.

As used herein, an 'aerosol-generating device' relates to a device that interacts with an aerosol-forming substrate to generate an aerosol. The aerosol-forming substrate may be part of an aerosol-generating article. An aerosol-generating device may be a device that interacts with an aerosol-forming substrate of an aerosol-generating article to generate an aerosol.

The aerosol-generating device is preferably a portable or handheld device that is comfortable to hold between the fingers of a single hand. The device may be substantially cylindrical in shape and has a length of between 70 and 120 millimeters. The maximum diameter of the aerosol-generating device is preferably between 10 and 20 millimeters. In one embodiment the device has a polygonal cross section and has a protruding button formed on one face.

In use of the aerosol-generating device, the susceptor heating element may be located in direct vicinity of the aerosol-forming substrate.

The invention also relates to an aerosol-generating system comprising an aerosol-generating device according to the description above and one or more aerosol-generating articles configured to be received within the aerosol-generating device. During operation an aerosol-generating article containing the aerosol-forming substrate may be partially contained within the aerosol-generating device.

The aerosol-generating system may include additional components, such as for example a charging unit for recharging an on-board electric power supply in an electrically operated or electric aerosol-generating device.

The invention also relates to an aerosol-generating article to be used with an aerosol-generating device as described above.

The aerosol-generating article may comprise a plurality of elements assembled in the form of a rod. The aerosol-generating article may have a mouth end and a distal end upstream from the mouth end. The plurality of elements may include an aerosol-forming substrate located at or towards the distal end of the rod. The plurality of elements may further include one or more hollow acetate tubes and filter plugs at either or only one end of the aerosol-generating article.

The aerosol-generating article may comprise a susceptor heating element as described above, which is arranged within the rod and which is arranged in thermal contact with the aerosol-forming substrate. The susceptor heating element may be located within the aerosol-forming substrate. Locating the susceptor heating element within the aerosol-forming substrate may ensure that the susceptor heating element is in direct contact with the aerosol-forming substrate that is to be heated.

Direct contact between the susceptor heating element and the aerosol-forming substrate may provide an efficient means for heating the aerosol-forming substrate to form an inhalable aerosol. In such a configuration, heat from the susceptor heating element may be conveyed almost instantaneously to at least a portion of the aerosol-forming substrate when heating is initiated. This may facilitate the rapid generation of an aerosol. Furthermore, the overall heating energy required to generate an aerosol may be lower than would be the case in an aerosol-generating system comprising a heater element where the aerosol-forming substrate does not directly contact the susceptor heating element and in which initial heating of the aerosol-forming substrate occurs primarily by convection or radiation. Where a susceptor heating element of an aerosol-generating device is in direct contact with an aerosol-forming substrate, initial heating of portions of the aerosol-forming substrate that are in direct contact with the internal heating element will be effected primarily by conduction. By locating the susceptor heating element within the aerosol-forming substrate, it may be ensured that the generated thermal energy is efficiently used and is directly transferred to the aerosol-forming substrate.

The susceptor heating element may be positioned in a radially central position within the rod and may extend along the longitudinal axis of the rod. By positioning the susceptor heating element in a central position, a symmetric radial heat distribution may be achieved. In particular, such design may assist in avoiding the creation of unexpected hot spots at the outer circumference of the aerosol-generating article.

The aerosol-forming substrate in the aerosol-generating article may be provided in the form of a rod. The aerosol-forming substrate may comprise a gathered sheet of aerosol-forming material. The aerosol-forming substrate may comprise strands of aerosol-forming material.

The aerosol-forming material may be a sheet of homogenized tobacco. The aerosol-forming material may be formed from strands of homogenized tobacco.

The aerosol-forming substrate may be a solid aerosol-forming substrate. Alternatively, the aerosol-forming substrate may comprise both solid and liquid components. The aerosol-forming substrate may comprise a tobacco-containing material containing volatile tobacco flavour compounds which are released from the substrate upon heating.

The aerosol-forming substrate may comprise nicotine. The aerosol-forming substrate may comprise tobacco. For example, the aerosol-forming material may be a sheet of homogenised tobacco. Alternatively, or in addition, the aerosol-forming substrate may comprise a non-tobacco containing aerosol-forming material. For example, the aerosol-forming material may be a sheet comprising a nicotine salt and an aerosol former.

If the aerosol-forming substrate is a solid aerosol-forming substrate, the solid aerosol-forming substrate may comprise, for example, one or more of: powder, granules, pellets, shreds, strands, strips or sheets containing one or more of: herb leaf, tobacco leaf, tobacco ribs, expanded tobacco and homogenised tobacco.

Optionally, the solid aerosol-forming substrate may contain tobacco or non-tobacco volatile flavour compounds, which are released upon heating of the solid aerosol-forming substrate. The solid aerosol-forming substrate may also contain one or more capsules that, for example, include additional tobacco volatile flavour compounds or non-tobacco volatile flavour compounds and such capsules may melt during heating of the solid aerosol-forming substrate.

Optionally, the solid aerosol-forming substrate may be provided on or embedded in a thermally stable carrier. The carrier may take the form of powder, granules, pellets, shreds, strands, strips or sheets. The solid aerosol-forming substrate may be deposited on the surface of the carrier in the form of, for example, a sheet, foam, gel or slurry. The solid aerosol-forming substrate may be deposited on the entire surface of the carrier, or alternatively, may be deposited in a pattern in order to provide a non-uniform flavour delivery during use.

As used herein, the term 'homogenised tobacco material' denotes a material formed by agglomerating particulate tobacco. As used herein, the term 'sheet' denotes a laminar element having a width and length substantially greater than the thickness thereof.

As used herein, the term 'gathered' is used to describe a sheet that is convoluted, folded, or otherwise compressed or constricted substantially transversely to the longitudinal axis of the aerosol-generating article.

The aerosol-forming substrate may comprise a gathered textured sheet of homogenised tobacco material.

As used herein, the term 'textured sheet' denotes a sheet that has been crimped, embossed, debossed, perforated or otherwise deformed. The aerosol-forming substrate may comprise a gathered textured sheet of homogenised tobacco material comprising a plurality of spaced-apart indentations, protrusions, perforations or a combination thereof.

The aerosol-forming substrate may comprise a gathered crimped sheet of homogenised tobacco material.

Use of a textured sheet of homogenised tobacco material may advantageously facilitate gathering of the sheet of homogenised tobacco material to form the aerosol-forming substrate.

As used herein, the term 'crimped sheet' denotes a sheet having a plurality of substantially parallel ridges or corrugations. Preferably, when the aerosol-generating article has been assembled, the substantially parallel ridges or corrugations extend along or parallel to the longitudinal axis of the aerosol-generating article. This advantageously facilitates gathering of the crimped sheet of homogenised tobacco material to form the aerosol-forming substrate.

However, it will be appreciated that crimped sheets of homogenised tobacco material for inclusion in the aerosol-generating article may alternatively or in addition have a plurality of substantially parallel ridges or corrugations that are disposed at an acute or obtuse angle to the longitudinal axis of the aerosol-generating article when the aerosol-generating article has been assembled.

The aerosol-forming substrate may be in the form of a plug comprising an aerosol-forming material circumscribed by a paper or other wrapper. Where an aerosol-forming substrate is in the form of a plug, the entire plug including any wrapper is considered to be the aerosol-forming substrate.

In a preferred embodiment, the aerosol-forming substrate comprises a plug comprising a gathered sheet of homogenised tobacco material, or other aerosol-forming material, circumscribed by a wrapper.

As used herein, the term 'aerosol former' is used to describe any suitable known compound or mixture of compounds that, in use, facilitates formation of an aerosol and that is substantially resistant to thermal degradation at the operating temperature of the aerosol-generating article.

Suitable aerosol-formers are known in the art and include, but are not limited to: polyhydric alcohols, such as propylene glycol, triethylene glycol, 1,3-butanediol and glycerine; esters of polyhydric alcohols, such as glycerol mono-, di- or triacetate; and aliphatic esters of 30 mono-, di- or polycarboxylic acids, such as dimethyl dodecanedioate and dimethyl tetradecanedioate.

Preferred aerosol formers are polyhydric alcohols or mixtures thereof, such as propylene glycol, triethylene glycol, 1,3-butanediol and, most preferred, glycerine.

The aerosol-forming substrate may comprise a single aerosol former. Alternatively, the aerosol-forming substrate may comprise a combination of two or more aerosol formers.

The aerosol-forming substrate may have an aerosol former content of greater than 5% on a dry weight basis.

The aerosol aerosol-forming substrate may have an aerosol former content of between approximately 5% and approximately 30% on a dry weight basis.

The aerosol-forming substrate may have an aerosol former content of approximately 20% on a dry weight basis. Aerosol-forming substrates comprising gathered sheets of homogenised tobacco for use in the aerosol-generating article may be made by methods known in the art.

The aerosol-forming substrate may have an external diameter of at least 5 mm. The aerosol-forming substrate may have an external diameter of between approximately 5 mm and approximately 12 mm, for example of between approximately 5 mm and approximately 10 mm or of between approximately 6 mm and approximately 8 mm. In a preferred embodiment, the aerosol-forming substrate has an external diameter of 7.2 mm+/−10%.

The aerosol-forming substrate may have a length of between approximately 5 mm and approximately 15 mm, for example between about 8 mm and about 12 mm. In an embodiment, the aerosol-forming substrate may have a length of approximately 10 mm. In a preferred embodiment, the aerosol-forming substrate may have a length of approximately 12 mm. Preferably, the elongate susceptor is approximately the same length as the aerosol-forming substrate.

The aerosol-forming substrate may be provided in the form of a rod comprising a gel of aerosol-forming material. The gel may be a tobacco based gel.

The gel composition may include: an alkaloid compound; glycerol; a hydrogen-bond crosslinking gelling agent; an ionic crosslinking gelling agent; and a viscosifying agent.

The gel composition may include an alkaloid compound, glycerol, hydrogen-bond crosslinking gelling agent, ionic crosslinking gelling agent and viscosifying agent.

The term "alkaloid compound" refers to any one of a class of naturally occurring organic compounds that contain one or more basic nitrogen atoms. Generally, an alkaloid contains at least one nitrogen atom in an amine-type structure. This or another nitrogen atom in the molecule of the alkaloid compound can be active as a base in acid-base reactions. Most alkaloid compounds have one or more of their nitrogen atoms as part of a cyclic system, such as for example a heterocylic ring. In nature, alkaloid compounds are found primarily in plants, and are especially common in certain families of flowering plants. However, some alkaloid compounds are found in animal species and fungi. In this disclosure, the term "alkaloid compound" refers to both naturally derived alkaloid compounds and synthetically manufactured alkaloid compounds.

The gel composition may preferably include an alkaloid compound selected from the group consisting of nicotine, anatabine, and combinations thereof.

The gel composition may comprise an aerosol former or glycerol to water ratio in a range from about 10:1 to about 2:1, or in a range from about 5:1 to about 3:1.

The gel composition may include gelling agents being the hydrogen-bond crosslinking gelling agent and the ionic crosslinking gelling agent. The gelling agents may form a solid medium in which the aerosol-former may be dispersed. The gel composition may include the gelling agents in a range from about 0.4 percent to about 10 percent by weight.

The gel composition may include the viscosifying agent in a range from about 0.2 percent to about 5 percent by weight.

The gel composition may include a gelling agent forming a solid medium, glycerol dispersed in the solid medium, and an alkaloid compound dispersed in the glycerol. The composition may form a stable gel phase.

The gel composition may include: about 1.5 percent to about 2.5 percent wt. nicotine; about 70 percent to about 75 percent wt. glycerol; about 18 percent to about 22 percent wt. water; about 0.5 percent to about 2 percent wt. each of agar, xanthan gum and low acyl gellan; and calcium ions. Each of the xanthan gum, agar, and low acyl gellan may be present in the gel composition in substantially equal amounts by weight.

Advantageously the gel is solid at room temperature. "Solid" in this context means that the gel has a stable size and shape and does not flow. Room temperature in this context means 25 degrees Celsius. A gel may be defined as a substantially dilute cross-linked system, which exhibits no flow when in the steady-state. By weight, gels may be mostly liquid, yet they behave like solids due to a three-dimensional cross-linked network within the liquid. It is the crosslinking within the fluid that gives a gel its structure (hardness). In this way gels may be a dispersion of molecules of a liquid within a solid in which liquid particles are dispersed in the solid medium.

The gel composition may have a viscosity of about 1,000,000 to about 1 Pascal per second, preferably 100,000 to 10 Pascal per second, preferably 10,000 to 1,000 Pascal per second, or 1,000 to 100 Pascal per second, or 500 to 200 Pascal per second to give the desired viscosity. Viscosity of the gel composition can be measured by taking the viscosity of a sample using an Anton Paar MCR 302 rheometer using a parallel plate PP25 with a P-PTD200+H-PTD200 measuring cell at 25 degrees Celsius at a shear rate of 1 per second.

The gel composition's mass may not change by more than about 20 percent, or may not change by more than about 15 percent, or may not change by more than about 10 percent, when exposed to a variety of environmental storage conditions. The composition may have an exterior shape with an exposed surface area that does not change by more than about 10 percent, or does not change by more than about 5 percent, or does not change by more than about 1 percent, when exposed to a variety of environmental conditions.

Advantageously, a gel composition provides predictable composition form upon storage or transit from manufacture to the consumer. The gel composition comprising an alkaloid compound substantially maintains its shape.

When the susceptor heating element is comprised in the aerosol-generating article, the aerosol-generating device may not comprise an additional susceptor heating element. In such embodiments, the device comprises an induction coil configured to generate an alternating magnetic field when an alternating current is provided to the coil. In use, when the aerosol-generating article is inserted into the aerosol-generating device, the magnetic field generated by the induction coil of the device is used for generating heat in the susceptor heating element comprised in the aerosol-generating article.

The present invention further relates to a method of manufacturing a susceptor heating element for use with an aerosol-generating device or for use with an aerosol-generating article. The method includes the steps of providing a shape memory material, forming the shape memory material into a predefined shape at temperatures of between 150 and 300 degrees Celsius, cooling down the shape memory material, and processing the shape memory material to obtain a susceptor heating element.

In the method the shape memory material is heated up to or above its transformation temperature. The shape-memory material is then formed into its desired shape, namely into the shape that the material will remember when it is heated. After shaping the material may be cooled down to room-temperature rapidly by quenching in water or by cooling with air.

The cooling rate may depend on the properties of the shape-memory material. The cooling rate may range between 1 and 300 degrees Celsius per minute. The cooling rate may range between 10 and 200 degrees Celsius per minute. The cooling rate may range between 20 and 100 degrees Celsius per minute.

The shape-memory material may then be rolled into bobbins and stored for subsequent use. During bobbin making and rod making the form of the shape-memory material might change. For example the material may be stretched during rolling into a bobbin. Such change of shape is usually irreversible in heating elements or susceptor heating elements made from conventional material. However, a susceptor heating element made from shape-memory material will recover its original shape when the susceptor heating element is heated up to its operating temperature. In this way a susceptor heating element will have the correct impedance and geometry for optimal utilization of the varying magnetic field generated by the induction element.

The shape-memory material of the susceptor heating element may be provided with any desired, predefined shape. The shape-memory material may be provided in the form of a wire or rod. The shape-memory material may be provided in the form of a strip or foil. The form of the shape-memory material may be adapted to the shape of the aerosol-forming substrate that is to be heated.

The temperature at which the shape-memory material is formed into its desired shape may correspond to the intended operation temperature of the heating element. In this way, it is ensured that the susceptor heating element recovers its intended shape upon use of the aerosol-generating device.

The temperature at which the shape-memory material is formed into its desired shape may range between 150 and 300 degrees Celsius. The temperature at which the shape-memory material is formed into its desired shape may range between 200 and 230 degrees Celsius.

There are plural shape-memory materials that have a transformation temperature that lie in the temperature range that is usually used in aerosol-generating devices. Suitable shape-memory materials for manufacturing the susceptor heating element of the present invention include alloy materials such as Titanium-Nickel-Paladium (Ti—Ni—Pd), Nickel-Titanium-Hafnium (Ni—Ti—Hf), Nickel-Titanium-Zirconium (Ni—Ti—Zr), and Copper-Aluminium-Nickel (Cu—Al—Ni). These metal alloys all have a transformation temperature that ranges between 100 and 530 degrees Celsius. Thus, these materials have a sufficiently good shape-memory effect and have at the same time relatively low material costs.

Features described in relation to one embodiment may equally be applied to other embodiments of the invention.

The invention will be further described, by way of example only, with reference to the accompanying drawings in which:

FIG. 1 shows an aerosol-generating device with an inductive heating element;

Figure 2:
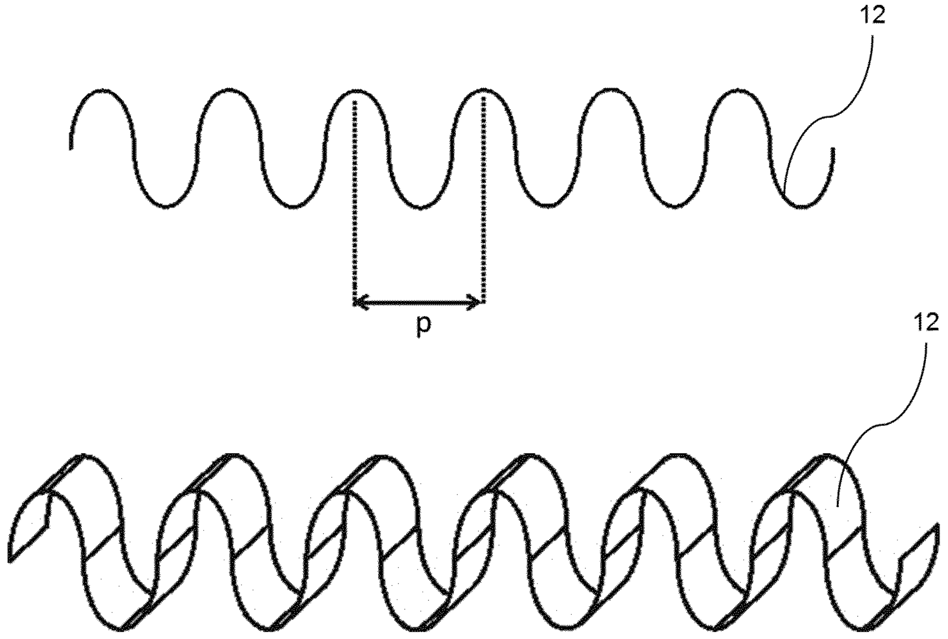
FIG. 2 shows corrugated susceptor heating elements of the present invention.

FIG. 1A and FIG. 1B show an aerosol-generating device 16 with a conventional inductive heating element 10. The inductive heating element 10 comprises an elongate susceptor heating element 12 that is arranged within an induction coil 14. The susceptor heating element 12 is a cylindrical element having a tapered tip. The susceptor heating element 12 and the induction coil 14 have a constant diameter along the longitudinal length of the inductive heating element 10.

As depicted in FIG. 1A, the aerosol-generating device 16 further comprises a housing 18. The induction coil 14 is arranged within the housing 18. The housing 18 also comprises a chamber 20 at a proximal end in which a consumable can be inserted. In the chamber 20, the susceptor heating element 12 of the conventional heating element 10 is arranged such that the susceptor heating element 12 can penetrate the consumable. In the housing 18 of the aerosol-generating device 16, a battery 22 is arranged as well as a controller 24 for controlling the supply of electrical power from the battery 22 to the conventional inductive heating element 10.

FIG. 2 shows various susceptor heating elements 12 according to the present invention. The upper view of FIG. 2 shows a susceptor heating element 12 formed from a rod of shape memory alloy. The rod is made from Titanium-Nickel-Paladium alloy and is provided with a corrugation. The susceptor heating element 12 has a wavy shape, with a regular sinusoidal pattern. The pitch p of the sinusoidal shape of the susceptor heating element 12 amounts to about 5 millimeters. In the lower view of FIG. 2 a further susceptor heating element 12 is depicted. This susceptor heating element 12 is formed from the same material but is formed from a foil having a width of 4 millimeters. Depending on the type of aerosol-generating device either of these susceptor heating elements 12 may be used.

Figure 3:
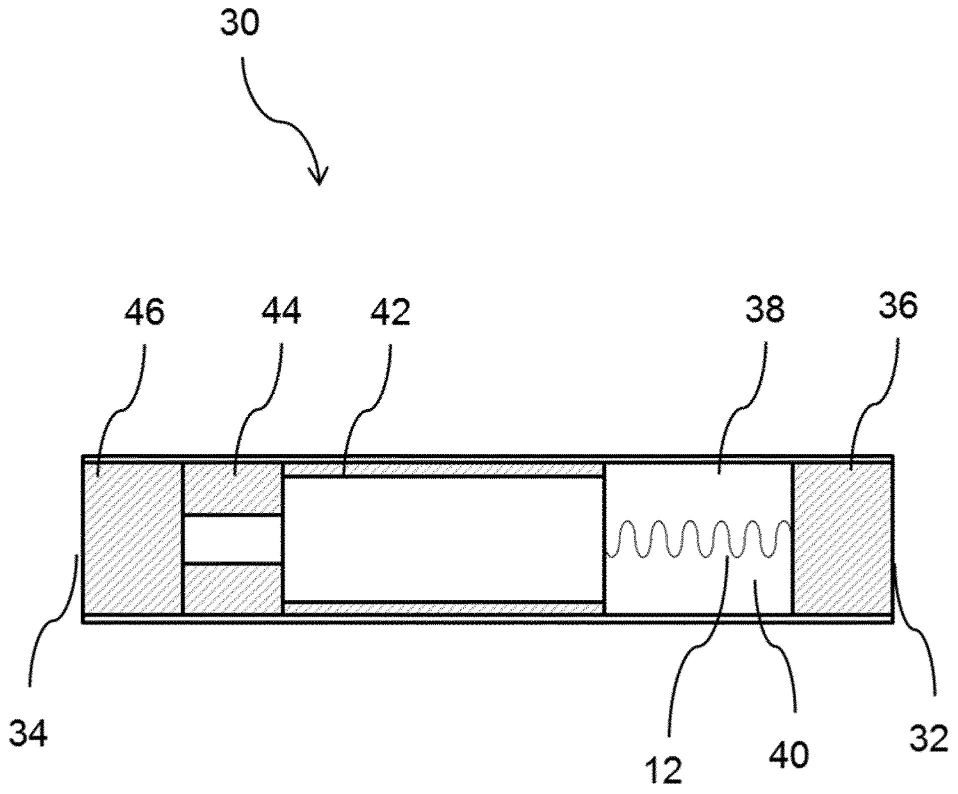
FIG. 3 shows an aerosol-generating article including a corrugated susceptor heating element.

FIG. 3 shows an aerosol-generating article 30 comprising a susceptor heating element 12. The aerosol-generating article 30 comprises a plurality of elements assembled in the form of a rod. The aerosol-generating article 30 has a distal end 32 and a mouth end 34 downstream from the distal end 32.

From distal end 32 to mouth end 34 the aerosol-generating article 30 comprises a front plug 36, an aerosol-forming portion 38, a first hollow acetate tube 42, a second hollow acetate tube 44 and a mouth piece filter 46.

The aerosol-forming portion 38 comprises the susceptor heating element 12 which is arranged in thermal contact with an aerosol-forming substrate 40. The aerosol-forming substrate 40 is provided in the form of a plug comprising a gathered sheet of homogenised tobacco material. The tobacco material is circumscribed by a paper wrapper. The same design of an aerosol-generating article may be used with aerosol-forming substrate provided in form of a gel as described above.

The susceptor heating element 12 is located centrally within the aerosol-forming substrate 40 of the aerosol-forming portion 38, such that any heat from the susceptor heating element 12 is conveyed almost instantaneously to the surrounding aerosol-forming substrate 40.

The aerosol-generating article 30 is inserted into an aerosol-generating device (not shown) comprising an induction coil configured to generate an alternating magnetic field when an alternating current is provided to the coil. The magnetic field generated by the induction coil of the device is used for generating heat in the susceptor heating element 12 comprised in the aerosol-generating article 30.

In use of the device, heat generated in the susceptor heating element 12 is used to vaporize volatile components in the aerosol-forming substrate 40. The airflow through the aerosol-generating article 30 carries the generated vapor from the aerosol-forming portion 38 downstream towards the mouth piece filter 46 into the condensation chamber 40, where an inhalable aerosol is formed. The vapor at least partly condenses in the inner volume defined by the first thin hollow acetate tubes 42 to form an aerosol. At the downstream end of the thin hollow acetate tube 42 ventilation holes (not shown) may be provided. The dimensions and the design of the hollow acetate tubes 42, 44 assist in shaping the aerosol to achieve a desired temperature range and droplet size.

Figure 4:
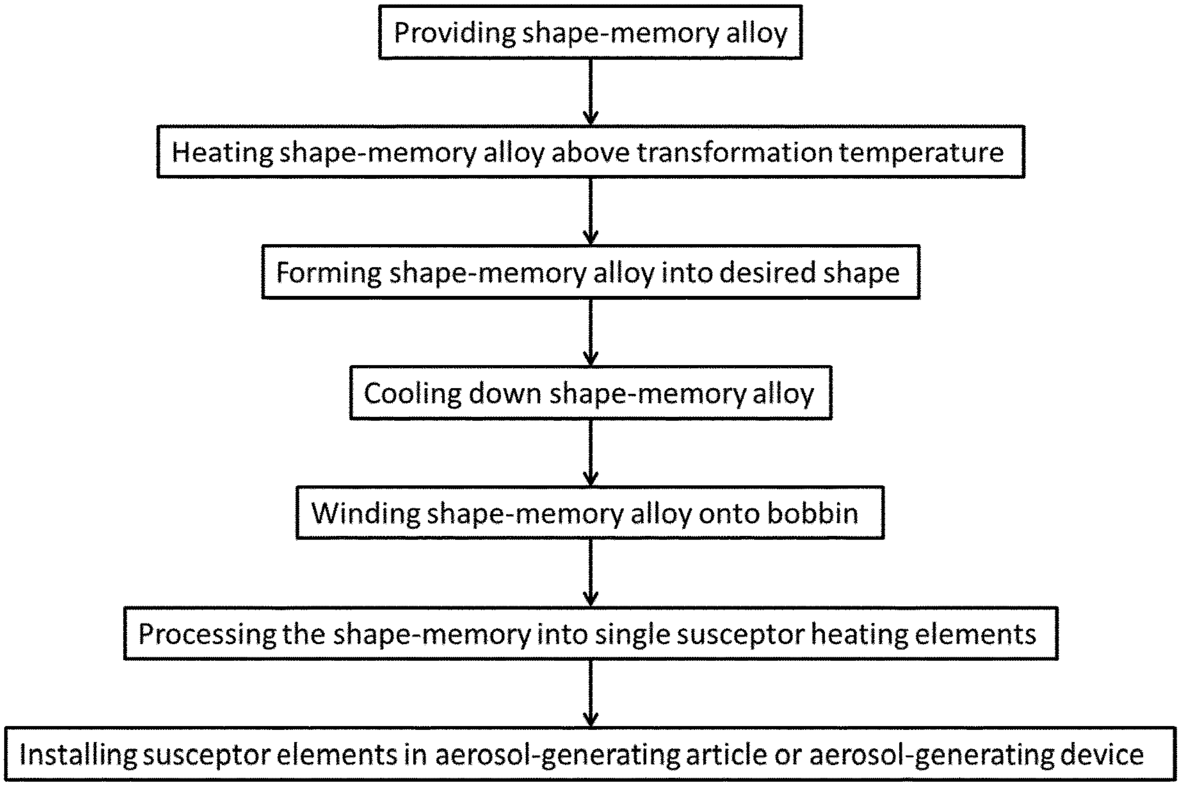
FIG. 4 schematically shows process steps of forming a susceptor heating element of the present invention.

In FIG. 4 the process steps of a manufacturing process for forming a susceptor heating element according to the present invention are indicated.

In a first step a rod-shaped or foil-shaped raw material of the shape-memory alloy is provided. This shape-memory alloy is then heated to a temperature at or above the transformation temperature of the shape-memory alloy. While the shape-memory alloy is held at this elevated temperature, the shape-memory alloy is formed into the desired shape, which the susceptor heating element is to recover upon use in the aerosol-generating device. After forming the shape-memory alloy into the desired shape, the shape-memory alloy is allowed to cool down. Subsequently the shape-memory alloy is rolled into bobbins for storage and later use. In order to form individual susceptor heating elements, the shape-memory material is rolled from the bobbin and processed into individual susceptor heating elements having a desired length as required by the aerosol-generating system in which the susceptor heating elements are to be used. The susceptor heating element may then be included in the heating chamber of an aerosol-generating device or may be incorporated in an aerosol-generating article of an aerosol-generating system.

The invention claimed is:

1. A susceptor heating element for an aerosol-generating device, the susceptor heating element being configured to heat an aerosol-forming substrate when received in the aerosol-generating device, and the aerosol-forming device comprising an induction coil configured to generate an alternating magnetic field when an alternating current is provided to the induction coil, wherein the susceptor heating element is formed from a shape-memory material, wherein the susceptor heating element is further configured to recover a corrugated shape in a range around an operating temperature, and wherein the range is between 180 degrees Celsius and 400 degrees Celsius.

2. The susceptor heating element according to claim 1, wherein the shape-memory material comprises a shape-memory alloy.

3. The susceptor heating element according to claim 2, wherein the shape-memory alloy is any of: Ti—Ni—Pd, Ni—Ti—Hf, Ni—Ti—Zr, and Cu—Al—Ni.

4. The susceptor heating element according to claim 1, wherein the corrugated shape of the susceptor heating element has a wavy shape having a constant wave pitch.

5. The susceptor heating element according to claim 1, wherein the susceptor heating element has two opposing major surfaces joined by two minor surfaces.

6. The susceptor heating element according to claim 1, wherein the susceptor heating element has a length and a cross-section perpendicular to the length, wherein the cross-section has a width and a depth, and wherein the length of the susceptor heating element is greater than the width of the cross-section, and the width of the cross-section is greater than the depth of the cross-section.

7. The susceptor heating element according to claim 1, wherein the susceptor heating element is in the form of a pin or a rod.

8. An aerosol-generating article, comprising:

a plurality of elements assembled in the form of a rod having a mouth end and a distal end upstream from the mouth end, the plurality of elements including an aerosol-forming substrate located at or towards the distal end of the rod, and a susceptor heating element arranged within the rod and in thermal contact with the aerosol-forming substrate, wherein the susceptor heating element is located within the aerosol-forming substrate, and wherein the susceptor heating element is formed from a shape-memory material.

9. The aerosol-generating article according to claim 8 for an aerosol-generating device, wherein the susceptor heating element is configured to recover a corrugated shape in a range around an operating temperature of the aerosol-generating device.

10. The aerosol-generating article according to claim 9, wherein the range is between 180 degrees Celsius and 400 degrees Celsius.

11. The aerosol-generating article according to claim 8, wherein the shape-memory material comprises a shape-memory alloy.

12. The aerosol-generating article according to claim 11, wherein the shape-memory alloy is any of: Ti-Ni-Pd, Ni-Ti-Hf, Ni-Ti-Zr, and Cu-Al-N.

13. The aerosol-generating article according to claim 9, wherein the corrugated shape of the susceptor heating element has a wavy shape having a constant wave pitch.

14. The aerosol-generating article according to claim 8, wherein the susceptor heating element has two opposing major surfaces joined by two minor surfaces.

15. The aerosol-generating article according to claim 8, wherein the susceptor heating element has a length and a cross-section perpendicular to the length, wherein the cross-section has a width and a depth, and wherein the length of the susceptor heating element is greater than the width of the cross-section, and the width of the cross-section is greater than the depth of the cross-section.

16. The aerosol-generating article according to claim 8, wherein the susceptor heating element is in the form of a pin or a rod.

17. The aerosol-generating article according to claim 8, wherein the susceptor heating element is positioned in a radially central position within the rod and extends along a longitudinal axis of the rod.

18. The aerosol-generating article according to claim 8, wherein the aerosol-forming substrate is in the form of a rod comprising a gathered sheet of aerosol-forming material, or in the form of a rod comprising strands of aerosol-forming material, or in the form of a rod comprising a gel of aerosol-forming material.

* * * * *